(12) United States Patent
Ryu et al.

(10) Patent No.: US 11,127,981 B2
(45) Date of Patent: Sep. 21, 2021

(54) BATTERY CELL INCLUDING BATTERY CASE HAVING PROTRUSION CORRESPONDING TO STEPPED ELECTRODE ASSEMBLY

(71) Applicant: LG CHEM, LTD., Seoul (KR)

(72) Inventors: Seungmin Ryu, Daejeon (KR); Ki Woong Kim, Daejeon (KR); Dong-Myung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 533 days.

(21) Appl. No.: 15/328,651

(22) PCT Filed: Sep. 9, 2015

(86) PCT No.: PCT/KR2015/009473
§ 371 (c)(1),
(2) Date: Jan. 24, 2017

(87) PCT Pub. No.: WO2016/043468
PCT Pub. Date: Mar. 24, 2016

(65) Prior Publication Data
US 2017/0214094 A1     Jul. 27, 2017

(30) Foreign Application Priority Data
Sep. 19, 2014   (KR) .................. 10-2014-0125098

(51) Int. Cl.
*H01M 10/05*     (2010.01)
*H01M 10/04*     (2006.01)
(Continued)

(52) U.S. Cl.
CPC ... *H01M 10/0585* (2013.01); *H01M 10/0413* (2013.01); *H01M 10/0436* (2013.01);
(Continued)

(58) Field of Classification Search
None
See application file for complete search history.

(56) References Cited

U.S. PATENT DOCUMENTS

2001/0005561 A1     6/2001  Yamada et al.
2007/0231683 A1*   10/2007  Lee ..................... H01M 2/021
                                                                429/161
(Continued)

FOREIGN PATENT DOCUMENTS

EP       2 955 768 A1    12/2015
JP       2000-200584 A    7/2000
(Continued)

OTHER PUBLICATIONS

International Search Report, issued in PCT/KR2015/009473 (PCT/ISA/210), dated Nov. 10, 2015.
(Continued)

*Primary Examiner* — Barbara L Gilliam
*Assistant Examiner* — Angela J Martin
(74) *Attorney, Agent, or Firm* — Birch, Stewart, Kolasch & Birch, LLP

(57) ABSTRACT

Disclosed herein is a battery cell having an electrode assembly mounted in a battery case, the battery cell including an electrode assembly configured to have a stepped structure in which two or more electrodes or unit cells have different planar sizes and a battery case, wherein a receiving part of the battery case is provided on the inner surface thereof with at least one protrusion protruding toward the electrode assembly.

20 Claims, 5 Drawing Sheets

(51) Int. Cl.
*H01M 10/0585* (2010.01)
*H01M 50/10* (2021.01)
*H01M 50/124* (2021.01)
*H01M 10/0525* (2010.01)
*H01M 10/052* (2010.01)

(52) U.S. Cl.
CPC ....... *H01M 10/0525* (2013.01); *H01M 50/10* (2021.01); *H01M 50/124* (2021.01); *H01M 10/052* (2013.01)

(56) References Cited

U.S. PATENT DOCUMENTS

2013/0130098 A1 5/2013 Lee et al.
2014/0011070 A1* 1/2014 Kim .................. H01M 2/0212
429/152

FOREIGN PATENT DOCUMENTS

| | | | |
|---|---|---|---|
| JP | 2001-167743 | A | 6/2001 |
| JP | 2010-501981 | A | 1/2010 |
| KR | 10-2005-0020357 | A | 3/2005 |
| KR | 10-2007-0098399 | A | 10/2007 |
| KR | 10-2013-0113366 | A | 10/2013 |
| KR | 10-2014-0005614 | A | 1/2014 |
| KR | 10-2014-0103402 | A | 8/2014 |
| WO | WO 2013/151249 | A1 | 10/2013 |
| WO | WO 2014/123329 | A1 | 8/2014 |

OTHER PUBLICATIONS

European Search Report for Appl. No. 15841182.7 dated Apr. 5, 2017.

* cited by examiner

[FIG. 1]
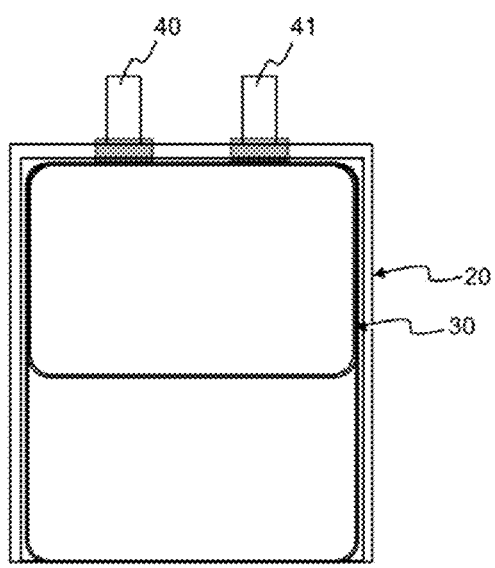
(a)
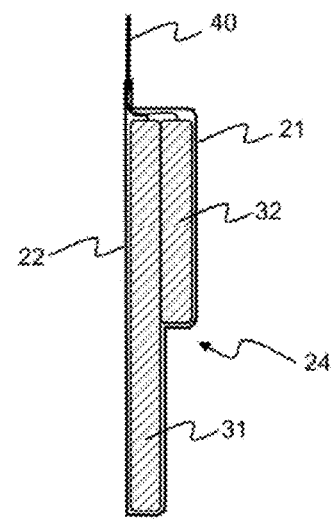
(b)

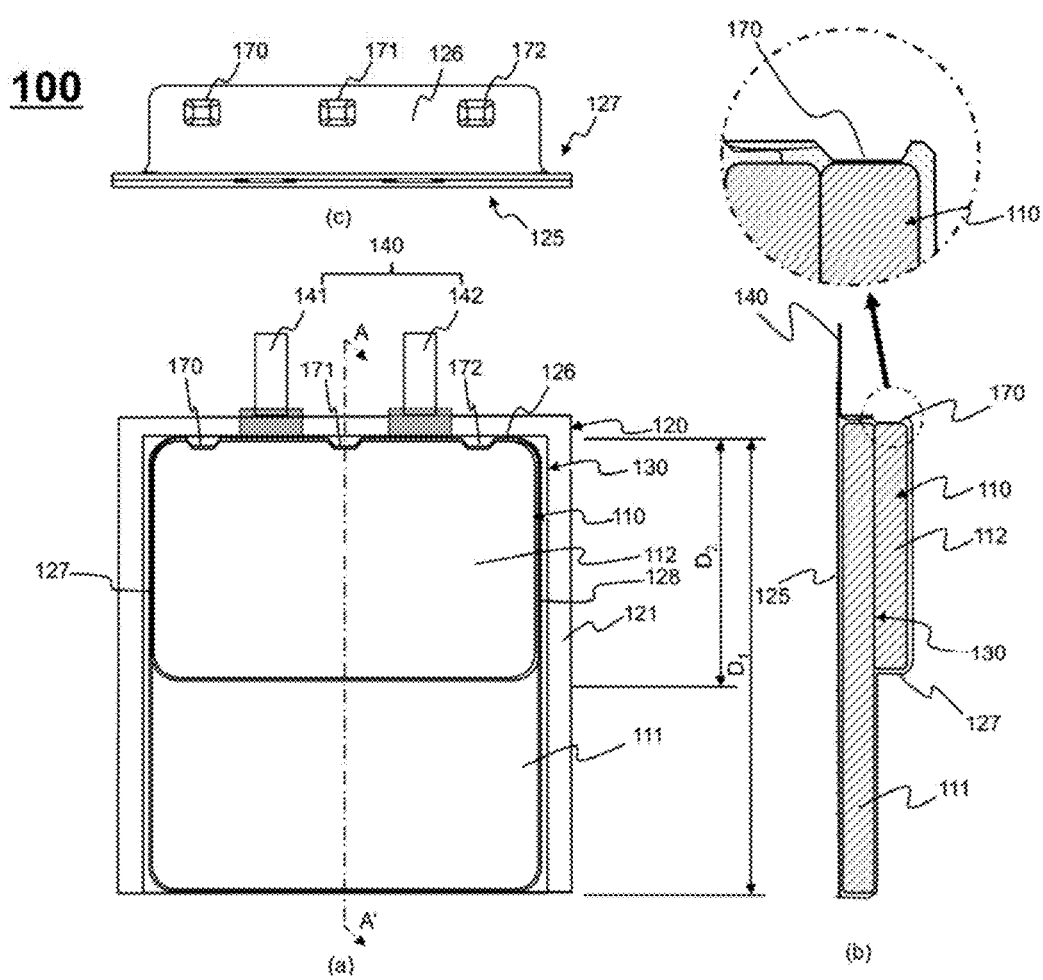

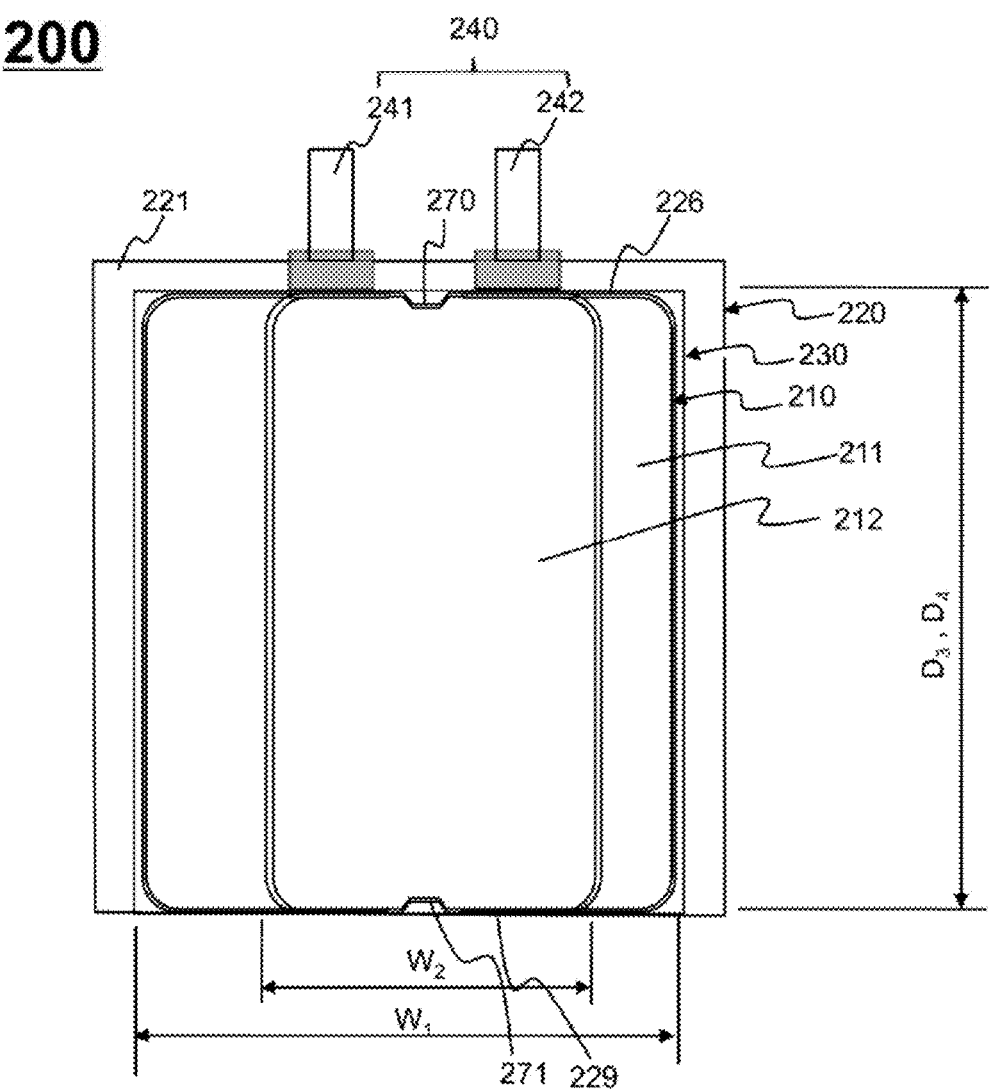
[FIG. 3]

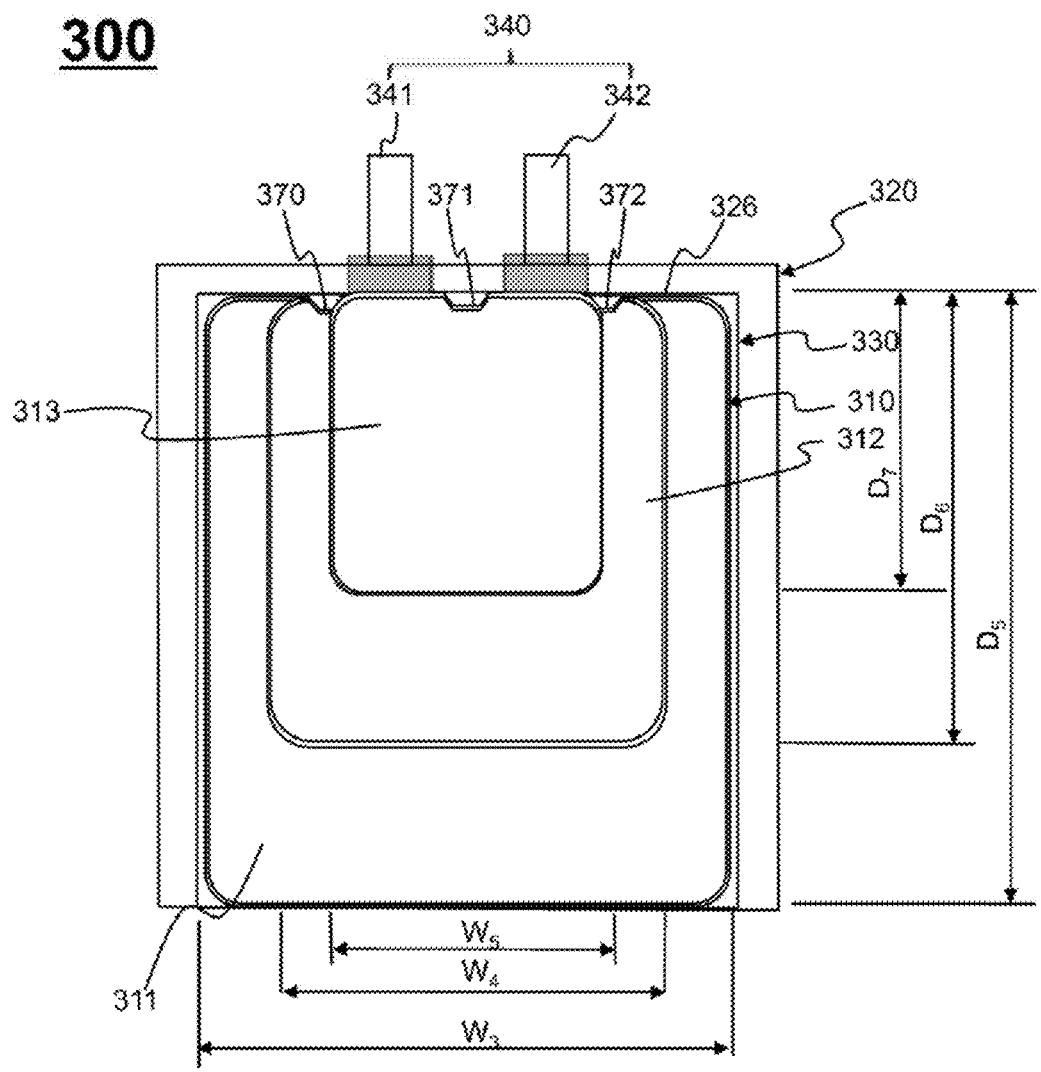

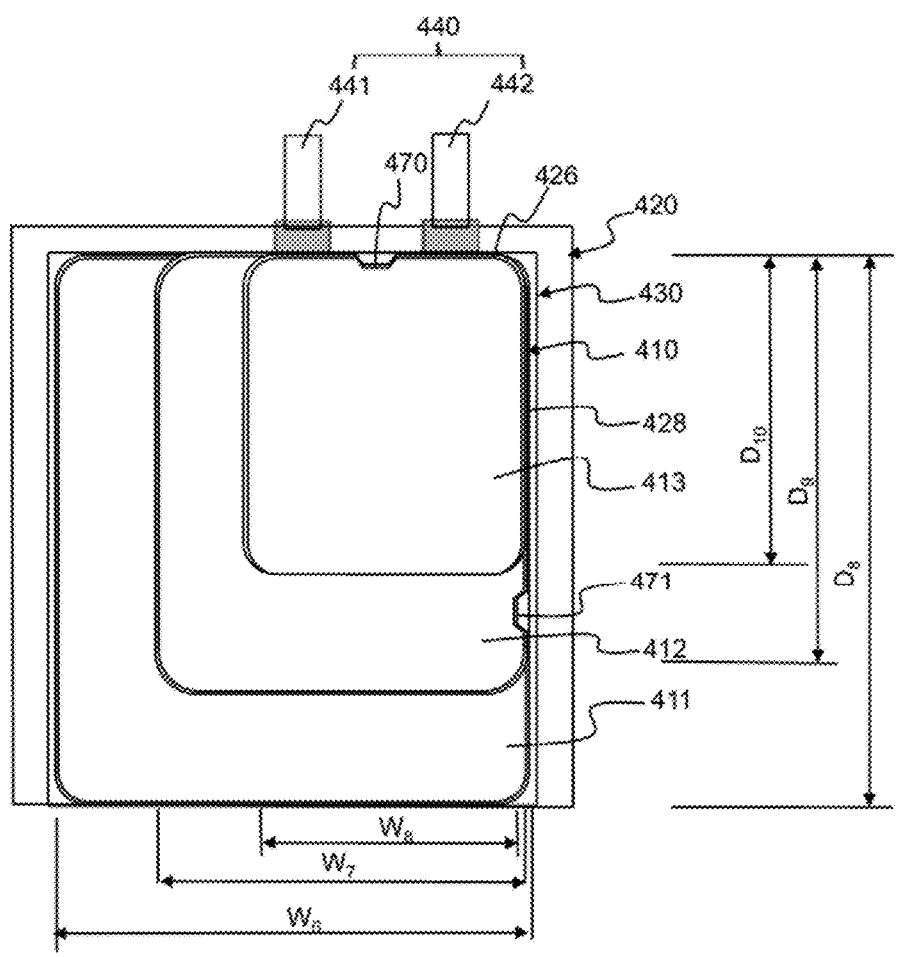
[FIG. 5]

BATTERY CELL INCLUDING BATTERY CASE HAVING PROTRUSION CORRESPONDING TO STEPPED ELECTRODE ASSEMBLY

CROSS-REFERENCE TO RELATED APPLICATIONS

This application claims the benefit of Korean Patent Application No. 10-2014-0125098 filed on Sep. 19, 2014 with the Korean Intellectual Property Office, the disclosure of which is herein incorporated by reference in its entirety.

TECHNICAL FIELD

The present invention relates to a battery cell including a battery case having a protrusion corresponding to a stepped electrode assembly.

Background Art

As mobile devices have been increasingly developed, and the demand for such mobile devices has increased, the demand for secondary batteries has sharply increased as an energy source for mobile devices. In recent years, secondary batteries have been used as power sources for electric vehicles (EV) and hybrid electric vehicles (HEV). Among such secondary batteries is a lithium secondary battery, which exhibits high energy density, discharge voltage, and output stability, the demand for which is high.

Based on the appearance thereof, a lithium secondary battery may be generally classified as a cylindrical battery, a prismatic battery, or a pouch-shaped battery. Based on the type of an electrolytic solution, a lithium secondary battery may also be classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

The electrode assembly is generally manufactured to have an approximately rectangular shape. The electrode assembly is mounted in a battery case to manufacture a pouch-shaped battery cell having a rectangular parallelepiped shape.

In recent years, however, new types of battery cells have been required in accordance with a trend change for a slim type design or various other designs. It is difficult for the rectangular electrode assembly to sufficiently utilize the space in a device. For this reason, electrode assemblies having various external shapes other than a general rectangular shape have been developed as electrode assemblies that can be applied in various forms based on the shape of a device to which the secondary battery is applied in response to the shape of mobile devices.

FIG. 1 is a plan view (a) and a side view (b) showing a battery cell including a stepped electrode assembly by way of example.

Referring to FIG. 1, a pouch-shaped secondary battery 10 is configured to have a structure in which an electrode assembly 30, which includes positive electrodes, negative electrodes, and separators disposed respectively between the positive electrodes and the negative electrodes, is mounted in a pouch-shaped battery case 20 in a sealed state such that two electrode leads 40 and 41, which are electrically connected to positive electrode tabs and negative electrode tabs of the electrode assembly 30, are exposed outward.

The electrode assembly 30 is configured to have a stepped structure in which a plurality of electrodes or unit cells 31 and 32 having different sizes is stacked in the height direction on the basis of a plane.

The battery case 20 includes a lower case 21, which includes a concave receiving part for receiving the electrode assembly 30, and an upper case 22 configured to cover the lower case 21 in order to seal the electrode assembly 30. In FIG. 1, the upper case 22 and the lower case 21 are shown as being integrally connected to each other. Alternatively, the upper case 22 and the lower case 21 may be separately provided. The receiving part of the battery case 20 is provided with a step 24 corresponding to the external shape of the electrode assembly 30.

As can be seen from the figure, the electrode assembly, which is received in the receiving part of the battery case, is designed such that the size of the electrode assembly corresponds to the size of the receiving part, whereby the electrode assembly is tightly received in the receiving part. However, a gap having a specific size may be provided between the electrode assembly and the receiving part due to the manufacturing tolerance thereof. Furthermore, in the case in which the electrode assembly is configured to have a stepped structure in which a plurality of electrodes or unit cells having different sizes is stacked in the height direction on the basis of a plane, the gap between the electrode assembly and the receiving part may be further increased due to the stepped shape, which is a complicated shape, which may lower the safety of the battery.

In the conventional battery cell, the electrode assembly may move due to the gap between the electrode assembly and the receiving part of the battery case, and the electrode assembly may easily be damaged when external and internal impacts are applied to the electrode assembly. For this reason, the demand for improving the safety of the battery cell including the stepped electrode assembly has been increased.

Therefore, there is a high necessity for a battery case that is capable of solving the above problem and a battery cell including the same.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in the case in which a receiving part of a battery case is provided on the inner surface thereof with one or more protrusions, which protrude toward the electrode assembly in order to prevent the movement of one or more electrodes or unit cells, as will be described hereinafter, it is possible to easily prevent a gap from being formed between the receiving part and the electrode assembly without the addition of a member for fixing the electrode assembly in the battery cell, thereby improving the safety of a battery cell. The present invention has been completed based on these findings.

Technical Solution

In accordance with one aspect of the present invention, the above and other objects can be accomplished by the provision of a battery cell having an electrode assembly, configured to have a structure in which separators are disposed respectively between positive electrodes and negative electrodes, mounted in a battery case, the battery cell including a battery case including an upper case and a lower case, the upper case and/or the lower case being provided with a receiving part for receiving an electrode assembly, and an electrode assembly configured to have a stepped structure in which a plurality of electrodes or unit cells is stacked in the height direction on the basis of a plane and at least two of the electrodes or unit cells have different planar sizes, wherein the receiving part of the battery case is provided on the inner surface thereof with at least one protrusion protruding toward the electrode assembly in order to prevent the movement of at least one of the electrodes or unit cells.

Here, that at least one protrusion protrudes toward the electrode assembly means that the protrusion is configured to have a shape in which the outer surface of the receiving part of the battery case is recessed inward, when viewed from outside the receiving part, and means that the protrusion is configured to have a shape in which the inner surface of the receiving part protrudes toward the electrode assembly, when viewed from inside the receiving part.

In the battery cell according to the present invention, therefore, the receiving part of the battery case is provided on the inner surface thereof with at least one protrusion protruding toward the electrode assembly in order to prevent the movement of at least one of the electrodes or unit cells. Consequently, it is possible to prevent a gap from being formed between the receiving part and the electrode assembly, thereby greatly improving the safety of the battery cell.

In addition, in the battery cell according to the present invention, for example, the electrode stacked at the lowermost layer of the stepped electrode assembly may have a relatively large planar size, and at least one electrode or unit cell having a relatively small planar size may be stacked on the lowermost electrode.

In the case in which the electrode assembly is configured to have a stepped structure in which a plurality of electrodes or unit cells having different sizes is stacked in the height direction on the basis of a plane, as described above, the structure of the electrode assembly may be more complicated than that of a conventional electrode assembly having a single layer structure, with the result that it is very difficult to accurately position the stacked electrodes or unit cells. In the case in which an electrode or unit cell having a relatively small size is stacked at a relatively high layer, the gap between the electrode or unit cell and the receiving part may be increased.

In a concrete example, therefore, the protrusion may be located so as to correspond to the side surface of at least one of the electrodes or unit cells having a relatively small planar size. Specifically, the protrusion may push at least one side surface of the electrode or unit cell having the relatively small planar size in order to prevent the movement of the electrodes or unit cells.

The protrusion may be formed by pressing the outer surface of the receiving part in the inward direction from outside. Specifically, the protrusion may be configured to have a pyramidal shape, a prism shape, or a hemispherical shape. More specifically, the protrusion may be configured to have a trapezoidal pillar shape.

In a concrete example, the at least two of the electrodes or unit cells having different planar sizes may have different widths in the direction in which electrode terminals are formed. Alternatively, the at least two of the electrodes or unit cells having different planar sizes may have different lengths in the direction in which the electrode terminals are formed. Alternatively, the at least two of the electrodes or unit cells having different planar sizes may have different widths and lengths in the direction in which the electrode terminals are formed.

In addition, the at least two of the electrodes or unit cells having different planar sizes may have the same thickness in the direction in which the electrodes or unit cells are stacked. Alternatively, the at least two of the electrodes or unit cells having different planar sizes may have different thicknesses in the direction in which the electrodes or unit cells are stacked. However, the present invention is not limited thereto. Specifically, the at least two of the electrodes or unit cells having different planar sizes may have different thicknesses in the direction in which the electrodes or unit cells are stacked.

In a concrete example, each of the unit cells may be a unit cell configured to have a structure in which one or more positive electrodes and one or more negative electrodes are stacked in the state in which one or more separators are disposed between the one or more positive electrodes and the one or more negative electrodes and in which the same kind of electrodes are located at opposite sides of the stacked structure or a unit cell configured to have a structure in which one or more positive electrodes and one or more negative electrodes are stacked in the state in which one or more separators are disposed between the one or more positive electrodes and the one or more negative electrodes and in which different kinds of electrodes are located at opposite sides of the stacked structure. Specifically, the unit cell having the same kind of electrodes located at opposite sides of the stacked structure may be configured to have a structure in which positive electrodes are located at opposite sides of the stacked structure or a structure in which negative electrodes are located at opposite sides of the stacked structure. For example, the unit cell may be configured to have a structure in which a positive electrode, a separator, a negative electrode, a separator, and a positive electrode are sequentially stacked. Alternatively, the unit cell may be configured to have a structure in which a negative electrode, a separator, a positive electrode, a separator, and a negative electrode are sequentially stacked. A larger number of positive electrodes and a larger number of negative electrodes may be provided. The unit cell having different kinds of electrodes located at opposite sides of the stacked structure may be configured to have a structure in which a positive electrode and a negative electrode are located at opposite sides of the stacked structure. For example, the unit cell may be configured to have a structure in which a positive electrode, a separator, and a negative electrode are sequentially stacked. A larger number of positive electrodes and a larger number of negative electrodes may be provided.

In addition, the shape of each of the electrodes or unit cells is not particularly restricted. For example, each of the electrodes or unit cells may be configured to have a parallelepiped shape. When viewed from above, each of the electrodes or unit cells may be configured to have a polygonal shape or a circular shape. Alternatively, each of the electrodes or unit cells may be configured to have a flat shape or a curved shape.

In addition, the at least two of the electrodes or unit cells having different planar sizes may be stacked in the state of being in contact with at least one selected from among the upper side surface, the rear side surface, the left side surface, and the right side surface of the receiving part in the direction in which the electrode terminals are formed, whereby the position of the protrusion may be set. For example, in the case in which the electrodes or unit cells are stacked in the state of being in contact with the upper side surface of the receiving part, the protrusion may be formed on the upper side surface of the receiving part.

In a concrete example, the at least two of the electrodes or unit cells having different planar sizes may have different widths in the direction in which the electrode terminals are formed. In this case, the electrodes or unit cells have different widths but have the same length. Consequently, the electrodes or unit cells may be stacked in the state of being in contact with the upper side surface and/or the lower side surface of the receiving part, and the protrusion may include one or more protrusions formed on the upper side surface of the receiving part, at which the electrode terminals are formed, when viewed from above, or one or more protrusions formed on the lower side surface of the receiving part opposite the upper side surface.

In another concrete example, the at least two of the electrodes or unit cells having different planar sizes may have different lengths in the direction in which the electrode terminals are formed. In this case, the electrodes or unit cells have different lengths but have the same width. Consequently, the electrodes or unit cells may be stacked in the state of being in contact with the upper side surface and the left and right side surfaces of the receiving part adjacent to the upper side surface, and the protrusion may include one or more protrusions formed on any one selected from among the upper side surface of the receiving part, at which the electrode terminals are formed, when viewed from above, and the left and right side surfaces of the receiving part adjacent to the upper side surface.

In a further concrete example, the at least two of the electrodes or unit cells having different planar sizes have different widths and lengths in a direction in which electrode terminals are formed. In this case, the electrodes or unit cells have different widths and. Consequently, the electrodes or unit cells may be stacked in the state of being in contact with the upper side surface of the receiving part or any one selected from among the upper side surface and the left and right side surfaces of the receiving part adjacent to the upper side surface, and the protrusion may include one or more protrusions formed on the upper side surface of the receiving part, at which the electrode terminals are formed, when viewed from above, or one or more protrusions formed on any one selected from among the upper side surface and the left and right side surfaces of the receiving part adjacent to the upper side surface.

As described above, in the battery cell according to the present invention, the shape and position of the protrusion may be changed depending on the difference in width and/or length between two or more electrodes or unit cells having different planar sizes and the position at which the electrodes or unit cells are stacked.

Meanwhile, the battery case may be a pouch-shaped case made of a laminate sheet including a resin layer and a metal layer. The upper case and the lower case may be integrally formed to constitute a single member, or may be formed separately from each other.

Specifically, the battery cell according to the present invention may be a lithium secondary battery.

The lithium secondary battery may be manufactured by placing the electrode assembly in the battery case and impregnating the electrode assembly with a non-aqueous electrolytic solution containing lithium salt.

In accordance with another aspect of the present invention, there is provided a method of manufacturing the battery cell.

Specifically, the method of manufacturing the battery cell according to the present invention includes a process of manufacturing a battery case including an upper case and a lower case, the upper case and/or the lower case being provided with a receiving part for receiving an electrode assembly, the receiving part being provided on the inner surface thereof with at least one protrusion for preventing movement of an electrode or unit cell, a process of manufacturing an electrode assembly configured to have a stepped structure in which a plurality of electrodes or unit cells is stacked in the height direction on the basis of a plane and at least two of the electrodes or unit cells have different planar sizes, and a process of injecting an electrolytic solution into the battery case in a state in which the electrode assembly is mounted in the battery case and sealing the outer edge of the battery case by thermal fusion.

Specifically, the process of manufacturing the battery case may include (a) a step of preparing a mold, (b) a step of disposing a pouch film on an upper surface of the mold, (c) a step of preparing a jig having a shape corresponding to the shape of the mold, and (d) a step of pressing the pouch film using the jig to form the receiving part for receiving the electrode assembly and to form the at least one protrusion on the inner surface of the receiving part.

In a concrete example, the protrusion may be formed at a position corresponding to the side surface of at least one of the electrodes or unit cells having a relatively small planar size.

In accordance with other aspects of the present invention, there are provided a battery pack including the battery cell as a unit cell and a device including the battery pack as a power source.

The device may be any one selected from among a smartphone, a mobile phone, a laptop computer, a tablet PC, a wearable electronic device, an electric vehicle, a hybrid electric vehicle, a plug-in hybrid electric vehicle, and a power storage system.

BRIEF DESCRIPTION OF DRAWINGS

The above and other objects, features and other advantages of the present invention will be more clearly understood from the following detailed description taken in conjunction with the accompanying drawings, in which:

FIG. 1 is a plan view and a side view showing a conventional battery cell including a stepped electrode assembly;

FIG. 2 is a plan view, an A-A' side sectional view, and a front view showing a battery cell according to an embodiment of the present invention; and FIGS. 3 to 5 are plan views showing battery cells according to other embodiments of the present invention.

BEST MODE

Now, exemplary embodiments of the present invention will be described in detail with reference to the accompanying drawings. It should be noted, however, that the scope of the present invention is not limited by the illustrated embodiments.

FIG. 2 is a plan view (a), an A-A' side sectional view (b), and a front view (c) schematically showing a battery cell according to an embodiment of the present invention.

Referring to FIG. 2, a battery case 120 of a battery cell 100 according to the present invention includes an upper case 125 and a lower case 127. The lower case 127 is provided with a receiving part 130, in which an electrode assembly 110 is mounted.

In addition, the electrode assembly 110 is configured to have a stepped structure in which two electrodes or unit cells 111 and 112 having different lengths $D_1$ and $D_2$ in the direction in which electrode terminals 140 are formed are stacked in the height direction on the basis of a plane. In the stepped structure, the electrode 111, which is stacked at the lowermost layer of the stepped electrode assembly 110, has a relatively large planar size, and the electrode or unit cell 112, which has a relatively small planar size, is stacked on the electrode 111.

The electrode assembly 110 is mounted in the receiving part 130 of the battery case 120 in a sealed state. Two electrode terminals 141 and 142 are exposed outward in the state of being electrically connected to positive and negative electrode tabs of the electrodes or unit cells 111 and 112.

In addition, the battery case 120 is provided with a sealed portion 121, by which the upper case 125 and the lower case 127 are connected to each other in a sealed state. The receiving part 130 is provided with a step corresponding to the external shape of the stepped electrode assembly 110.

In addition, the electrodes or unit cells 111 and 112, the planar sizes of which are different from each other, are configured such that the lengths $D_1$ and $D_2$ of the electrodes or unit cells 111 and 112 are different from each other in the direction in which the electrode terminals 140 are formed. The electrodes or unit cells 111 and 112 are stacked in the state of being in contact with the upper side surface 126 and the left and right side surfaces 127 and 128 of the receiving part.

The receiving part 130 is provided on the inner surface thereof with protrusions 170, 171, and 172, which protrude toward the electrode assembly 110 in order to prevent the movement of the electrodes or unit cells 111 and 112.

Referring to the front view (c), each of the protrusions 170, 171, and 172 is configured to have a trapezoidal pillar shape in which the outer surface of the receiving part 130 of the battery case is recessed inward. Referring to the side sectional view (b), each of the protrusions 170, 171, and 172 is configured to have a trapezoidal pillar shape in which the inner surface of the receiving part protrudes toward the electrode assembly 110.

In addition, the protrusions 170, 171, and 172 are located so as to correspond to the side surface of the electrode or unit cell 112, the planar size of which is relatively small, which is one of the electrodes or unit cells 111 and 112. The protrusions 170, 171, and 172 may push the side surface of the electrode or unit cell 112 in order to prevent the movement of the electrode or unit cell 112.

Meanwhile, FIGS. 3 to 5 are plan views schematically showing battery cells according to other embodiments of the present invention.

Referring first to FIG. 3, a battery cell 200 of FIG. 3 is configured to have a structure in which electrodes or unit cells 211 and 212 having different planar sizes are received in a receiving part 230 of a battery case 220, and the electrodes or unit cells 211 and 212, the planar sizes of which are different from each other, are configured such that widths $W_1$ and $W_2$ of the electrodes or unit cells 211 and 212 are different from each other in the direction in which electrode terminals 240 are formed. That is, the width $W_1$ of the electrode or unit cell 211, which is stacked at the lowermost layer in the direction in which the electrodes or unit cells are stacked, is greater than the width $W_2$ of the electrode 212. The electrodes 211 and 212 are stacked in the state of being in contact with the upper side surface 226 and the lower side surface 229 of the receiving part 230. Protrusions 270 and 271 are formed on the upper side surface 226 and the lower side surface 229 of the receiving part 230, respectively. The protrusions 270 and 271 are located at positions corresponding to the side surfaces of the electrode or unit cell 212 to prevent the movement of the electrode or unit cell 212.

Referring first to FIG. 4, a battery cell 300 of FIG. 4 is configured to have a structure in which three electrodes or unit cells 311, 312, and 313 having different planar sizes are received in a receiving part 330 of a battery case 320, and the electrodes or unit cells 311, 312, and 313 are configured such that widths $W_3$, $W_4$, and $W_5$ and lengths $D_5$, $D_6$, and $D_7$ of the electrodes or unit cells 311, 312, and 313 are different from one another in the direction in which electrode terminals are formed. The electrodes or unit cells 311, 312, and 313 are stacked in the state of being in contact with the upper surface 326 of the receiving part. Protrusions 370, 371, and 372 are formed on the upper side surface 326 of the receiving part. The protrusion 371 is located at a position corresponding to the side surface of the electrode or unit cell 313, which is stacked at the uppermost layer in the direction in which the electrodes or unit cells are stacked, and the protrusions 371 and 372 is located at positions corresponding to the side surface of the electrode or unit cell 312, which is stacked at the middle layer, whereby it is possible to prevent the movement of the electrode or unit cell 312 and 313.

Referring first to FIG. 5, a battery cell 400 of FIG. 5 is configured to have a structure in which three electrodes or unit cells 411, 412, and 413 having different planar sizes are received in a receiving part 430 of a battery case 420, and the electrodes or unit cells 411, 412, and 413 are configured such that widths $W_6$, $W_7$, and $W_8$ and lengths $D_8$, $D_9$, and $D_{10}$ of the electrodes or unit cells 311, 312, and 313 are different from one another in the direction in which electrode terminals are formed, in the same manner as in the battery cell 300 of FIG. 4. The electrodes or unit cells 411, 412, and 413 are stacked in the state of being in contact with the upper surface 426 and the right side surface 428 of the receiving part 430. Protrusions 470 and 471 are formed on the upper side surface 426 and the right side surface 428 of the receiving part 430, respectively. The protrusion 470 is located at a position corresponding to the upper side surface of the electrode or unit cell 413, which is stacked at the uppermost layer in the direction in which the electrodes or unit cells are stacked, and the protrusion 471 is located at a position corresponding to the right side surface of the electrode or unit cell 412, which is stacked at the middle layer, whereby it is possible to prevent the movement of the electrode or unit cell 412 and 413.

As described above, in the battery cell according to the present invention, the shape and position of the protrusions are changed depending on the difference in width and/or length between two or more electrodes or unit cells having different planar sizes and the position at which the electrodes or unit cells are stacked.

In the battery cell according to the present invention described above, the receiving part of the battery case is provided on the inner surface thereof with protrusions, which protrude toward the electrode assembly in order to prevent the movement of one or more electrodes or unit cells. Consequently, it is possible to prevent a gap from being formed between the receiving part and the electrode assembly, thereby greatly improving the safety of the battery cell.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in the battery cell according to the present invention, the receiving part of the battery case is provided on the inner surface thereof with protrusions, which protrude toward the electrode assembly in order to prevent the movement of one or more electrodes or unit cells. Consequently, it is possible to prevent a gap from being formed between the receiving part and the electrode assembly without the addition of a member for fixing the electrode assembly in the battery cell, thereby greatly improving the safety of the battery cell against external impact.

The invention claimed is:

1. A battery cell having an electrode assembly, configured to have a structure in which separators are disposed respectively between positive electrodes and negative electrodes, mounted in a battery case, the battery cell comprising:
   a battery case comprising an upper case and a lower case, the upper case and/or the lower case being provided with a receiving part for receiving an electrode assembly; and
   an electrode assembly configured to have a stepped structure in which a plurality of electrodes or unit cells is stacked in a height direction on a basis of a plane and at least two of the electrodes or unit cells have different planar sizes, wherein
   one of the at least two of the electrodes or unit cells having different planar sizes has electrode leads extending therefrom through the battery case,
   the receiving part of the battery case is provided on an inner surface thereof with at least one protrusion protruding toward another of the at least two of the electrodes or unit cells having a smaller planar size than the one of the at least two electrodes or unit cells in order to prevent movement of at least two of the electrodes or unit cells, and
   the protrusion is located so as to correspond to a side surface of the another of the electrodes or unit cells and formed entirely above the one of the at least two electrodes or unit cells.

2. The battery cell according to claim 1, wherein the protrusion pushes at least one side surface of the electrode or unit cell having the relatively small planar size in order to prevent the movement of the electrodes or unit cells.

3. The battery cell according to claim 1, wherein the protrusion is formed by pressing an outer surface of the receiving part in an inward direction from outside.

4. The battery cell according to claim 1, wherein the protrusion is configured to have a pyramidal shape, a prism shape, or a hemispherical shape.

5. The battery cell according to claim 1, wherein the protrusion is configured to have a trapezoidal pillar shape.

6. The battery cell according to claim 1, wherein the at least two of the electrodes or unit cells having different planar sizes have different widths and/or lengths in a direction in which electrode terminals are formed.

7. The battery cell according to claim 1, wherein the at least two of the electrodes or unit cells having different planar sizes have different thicknesses in a direction in which the electrodes or unit cells are stacked.

8. The battery cell according to claim 1, wherein each of the unit cells is a unit cell configured to have a structure in which one or more positive electrodes and one or more negative electrodes are stacked in a state in which one or more separators are disposed between the one or more positive electrodes and the one or more negative electrodes and in which the same kind of electrodes are located at opposite sides of the stacked structure, or a unit cell configured to have a structure in which one or more positive electrodes and one or more negative electrodes are stacked in a state in which one or more separators are disposed between the one or more positive electrodes and the one or more negative electrodes and in which different kinds of electrodes are located at opposite sides of the stacked structure.

9. The battery cell according to claim 1, wherein the at least two of the electrodes or unit cells having different planar sizes have different widths in a direction in which electrode terminals are formed, and wherein the protrusion comprises one or more protrusions formed on an upper side surface of the receiving part, at which the electrode terminals are formed, when viewed from above, and one or more protrusions formed on a lower side surface of the receiving part opposite the upper side surface.

10. The battery cell according to claim 1, wherein the at least two of the electrodes or unit cells having different planar sizes have different lengths in a direction in which electrode terminals are formed, and wherein the protrusion comprises one or more protrusions formed on any two selected from among an upper side surface of the receiving part, at which the electrode terminals are formed, when viewed from above, and left and right side surfaces of the receiving part adjacent to the upper side surface.

11. The battery cell according to claim 1, wherein the at least two of the electrodes or unit cells having different planar sizes have different widths and lengths in a direction in which electrode terminals are formed, and wherein the protrusion comprises one or more protrusions formed on an upper side surface of the receiving part, at which the electrode terminals are formed, when viewed from above, or one or more protrusions formed on any one selected from among the upper side surface and left and right side surfaces of the receiving part adjacent to the upper side surface.

12. The battery cell according to claim 1, wherein the battery case is a pouch-shaped case made of a laminate sheet comprising a resin layer and a metal layer.

13. The battery cell according to claim 1, wherein the upper case and the lower case are integrally formed to constitute a single member, or are formed separately from each other.

14. The battery cell according to claim 1, wherein the battery cell is a lithium secondary battery.

15. A method of manufacturing the battery cell according to claim 1, the method comprising:
a process of manufacturing the battery case comprising the upper case and the lower case, the upper case and/or the lower case being provided with the receiving part for receiving the electrode assembly, the receiving part being provided on the inner surface thereof with at least one protrusion for preventing movement of the electrode or unit cell; a process of manufacturing the electrode assembly configured to have the stepped structure in which the plurality of electrodes or unit cells is stacked in the height direction on the basis of the plane and at least two of the electrodes or unit cells have different planar sizes; and a process of injecting an electrolytic solution into the battery case in a state in which the electrode assembly is mounted in the battery case and sealing an outer edge of the battery case by thermal fusion.

16. The method according to claim 15, wherein the process of manufacturing the battery case comprises:
 (a) a step of preparing a mold;
 (b) a step of disposing a pouch film on an upper surface of the mold;
 (c) a step of preparing a jig having a shape corresponding to a shape of the mold; and
 (d) a step of pressing the pouch film using the jig to form the receiving part for receiving the electrode assembly and to form the at least one protrusion on the inner surface of the receiving part.

17. The method according to claim 15, wherein the protrusion is formed at a position corresponding to a side surface of at least one of the electrodes or unit cells having a relatively small planar size.

18. A battery pack comprising the battery cell according to claim 1 as a unit cell.

19. A device comprising the battery pack according to claim 18 as a power source.

20. The device according to claim 19, wherein the device is selected from among a smartphone, a mobile phone, a laptop computer, a tablet PC, a wearable electronic device, an electric vehicle, a hybrid electric vehicle, a plug-in hybrid electric vehicle, and a power storage system.

* * * * *